United States Patent Office 3,475,919
Patented Nov. 4, 1969

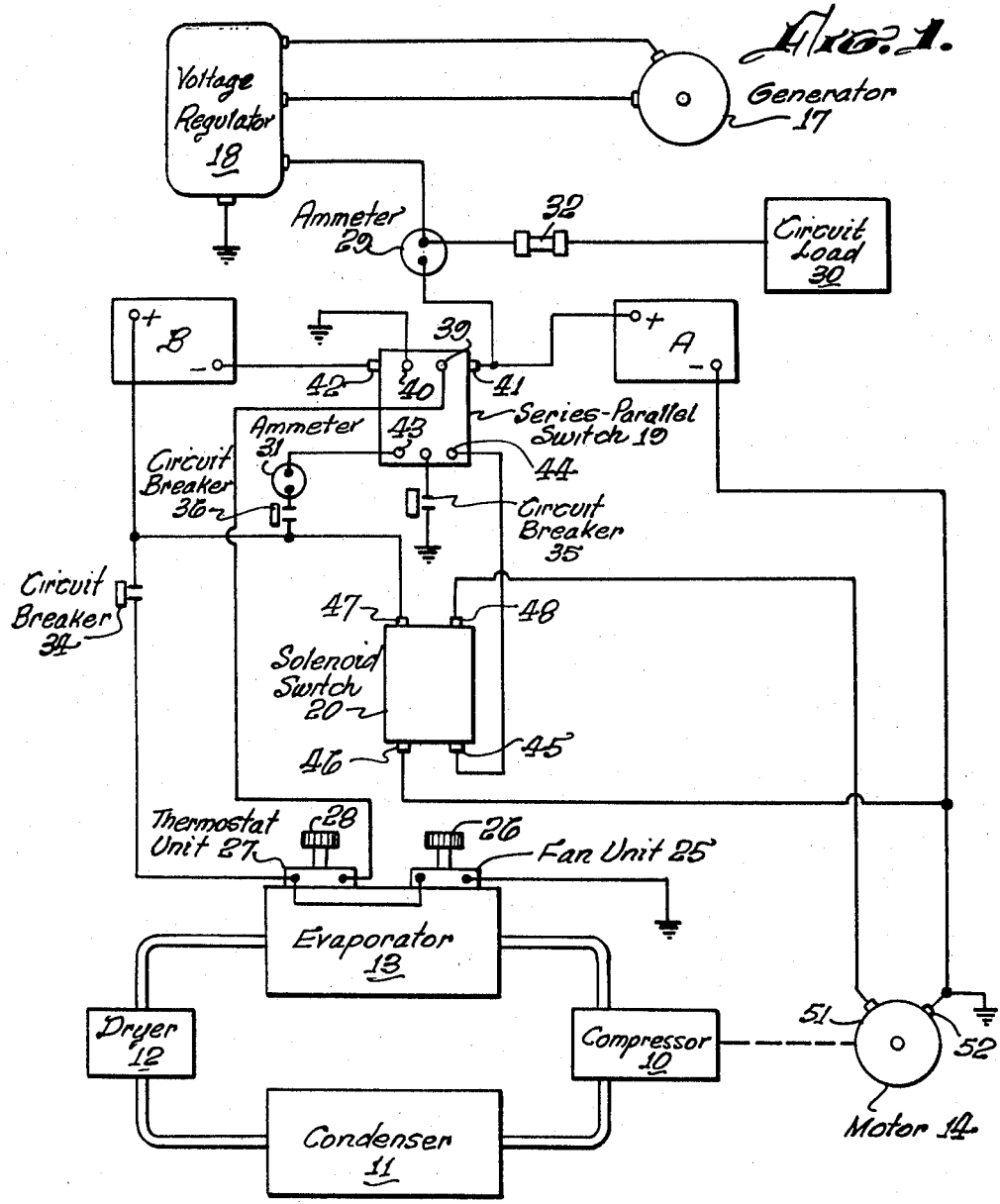

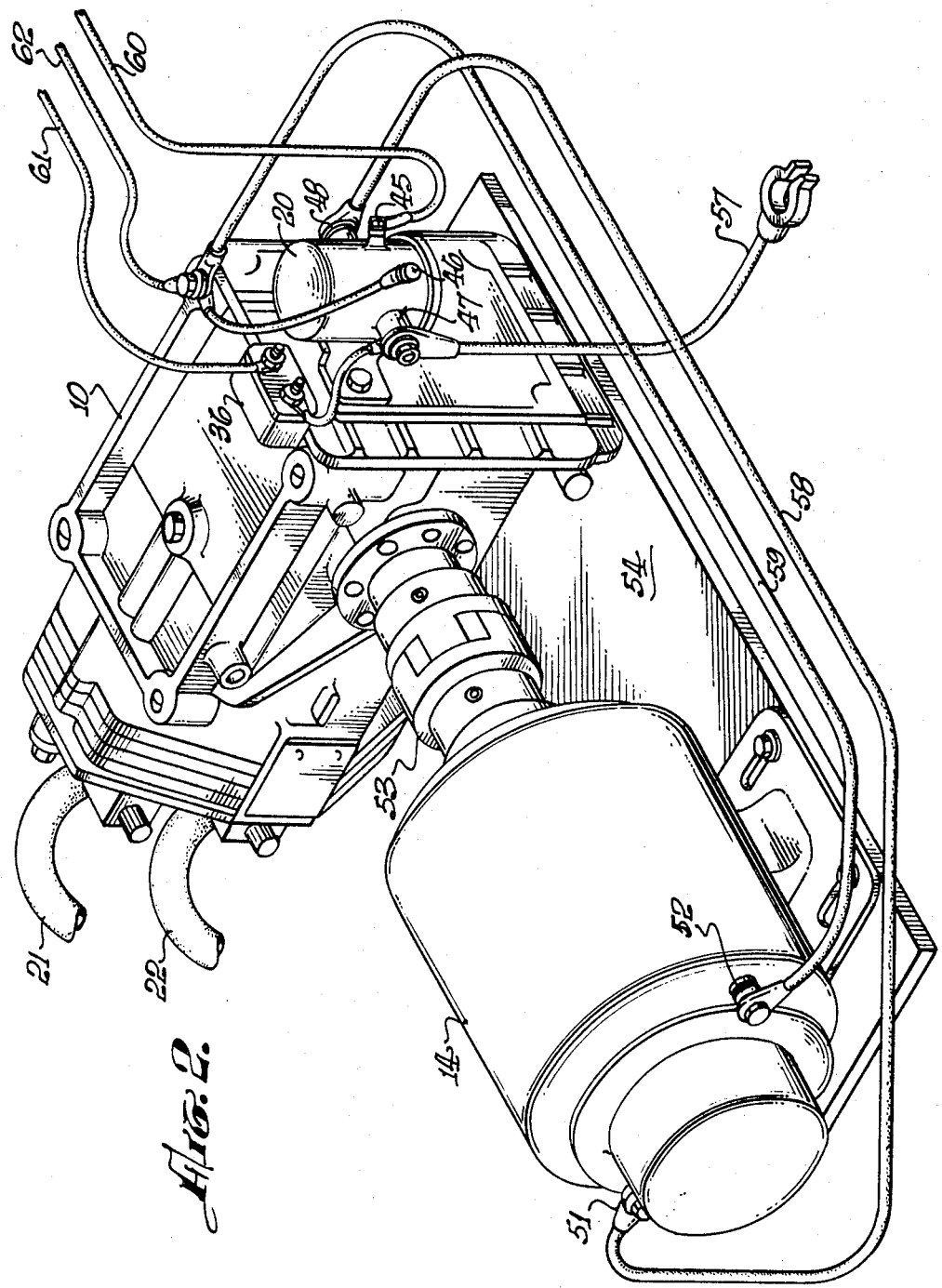

3,475,919
VEHICLE AIR CONDITIONER WITH ELECTRICAL DRIVE MEANS
Joe D. Ellis, 1101 E. Columbia, Pomona, Calif. 91767
Filed Jan. 5, 1968, Ser. No. 695,949
Int. Cl. F27b 27/00
U.S. Cl. 62—228
14 Claims

ABSTRACT OF THE DISCLOSURE

An air conditioning system for motor vehicles, particularly trucks and automobiles, in which the air conditioning compressor is mechanically driven by an electric motor, and which electric motor is electrically driven, for example, by two twelve volt batteries in the system through a series-parallel switch providing an input voltage of twenty-four volts to the electric motor during those periods the electric motor is operating.

---

The present invention relates to an air conditioning system for motor vehicles such as trucks and automobiles. The present invention and prior air conditioning systems in use in autos and trucks all contain the usual and necessary compressor, the function of the compressor being to circulate the refrigerant through the system and to raise the pressure of the refrigerant. The prior systems utilize the mechanical driving power of the motor vehicle engine to operate the compressor. This is generally done by connecting the engine crankshaft to the compressor by means of pulleys and pulley belt, with appropriate clutches. This restricts the location of the compressor to the area immediately adjacent the motor vehicle engine.

In the present invention the compressor of the air-conditioner is driven by an electric motor which in turn is operated by electric batteries. The electrical portion of this system supplies, for example, 24 volts to the electric motor from two 12 volt batteries, that are, through appropriate switching, connected in series upon command of a cool air thermostat. This reduces amperage drain on the batteries. The system also permits both batteries to be charged by the generator of the motor vehicle while the electric motor is not operating.

The use of an electrical power source instead of a mechanical power source removes the necessity of locating the compressor adjacent the motor engine. In prior truck air conditioning systems it is not at all unusual to find long hoses from the compressor in the engine compartment to the rest of the air conditioning unit located high on the truck cab. Further, there are many trucks and autos on the road that do not have air conditioning systems and the present invention can be installed much more rapidly than prior systems since no mechanical connection need be made between the compressor and the vehicle engine. When installations are being made on a diesel truck it is not unusual for the task to require 1½ days to complete. On this type of truck down time is money lost. By contrast, the present invention can be installed in a couple of hours. The instant air conditioning system, including compressor, can be mounted on truck fender wells, cab roofs, rear walls of cabs, and is ideally suited for campers. Of course, the installer will generally prefer to have the batteries under the vehicle hood with the engine and generator of the vehicle.

Other advantages of the present invention are no drain on vehicle horsepower, since the compressor is not connected to the engine, and no loss in fuel mileage. Further, the compressor speed is no longer dependent on vehicle engine speed, no clutch is needed and there are no belts or idlers turning when the compressor is off. Still other advantages will become apparent from the detailed description of the invention and accompanying drawings wherein:

FIG. 1 is a diagrammatic showing of an electric circuit such as may be employed in the present invention; and FIG. 2 is a perspective view of an embodiment of an air conditioning system made in accordance with the invention.

Referring now to the drawings, FIGURE 1 discloses a standard refrigerant cycle including a compressor 10, condenser 11, dryer 12, and evaporator 13. The compressor is driven by electric motor 14. The electrical apparatus, in addition to the motor 14, includes batteries A and B, generator 17, voltage regulator 18, a series-parallel switch 19, and a solenoid type switch 20.

FIGURE 2 illustrates the electric motor 14 mechanically connected to drive the compressor 10. The solenoid type switch 20 is shown fastened to one end of the compressor. Refrigerant intake and outlet lines 21 and 22 are shown emerging from the compressor. The electrical connections to the electric motor and the solenoid type switch are also shown.

Turning now to a detailed description of the apparatus, reference is again made to FIGURE 1. The refrigerant cycle of the system is the standard motor vehicle air conditioning refrigerant cycle. The compressor, condenser, evaporator and dryer are all conventional devices and, accordingly, no detailed illustration thereof is believed necessary. One such standard commercially available refrigerant cycle apparatus that has been used in the present invention is the Mark IV Automotive Air Conditioning Unit made by the John E. Mitchell Co., Dallas, Tex. The evaporator 13 has a fan unit 25 shown with a control knob 26. For purposes of the schematic representation, control knob 26 has been enlarged. A thermostat unit 27 is also part of the evaporator, with its attendant control knob 28—also enlarged for purposes of the schematic representation only.

The electric motor 14 is a direct current motor, and one such motor that has been used in the present invention is a 2 H.P., 3000 r.p.m., 24 volt, D.C. motor manufactured by Sharp Electric, Long Beach, Calif. The batteries A and B are merely standard 12 volt automotive batteries. Of course, each 12 volt battery could be replaced by two 6 volt batteries, if desired for some reason. The series-parallel switch 19 is a standard commercially available item, one switch having been used in the present invention being the Delco-Remy series-parallel switch manufactured by the Delco-Remy division of General Motors Corporation. Solenoid switch 20 is a standard commercially available solenoid switch and, when its function is later described, it will be seen that there are many solenoid type switches that could perform the needed function.

The generator 17, voltage regulator 18, and an ammeter 29 are those of the particular motor vehicle in which this system is employed, but they are for a 12 volt automotive electrical system. The circuit load, indicated in block diagram form, designated by numeral 30, is the electrical appliances of the motor vehicle such as headlights, radio, ignition system, and the like. Fuse 32 is merely representative, as there are generally a number of fuses used in the load circuits, most often all arranged on a fuse panel or board. The ammeter 31 is optional, but its use will provide a visual indication of whether switches 19 and 20 are operative. As a safety precaution, circuit breakers 34, 35, and 36 are interposed in appropriate portions of the circuitry.

Turning now to a description or explanation of the operation of the system and apparatus, attention is first directed to the two controls on the evaporator 13. The fan unit 25 is turned on by control knob 26 and air is circulated through the evaporator. Thermostat unit 27 monitors the temperature of the cool outlet air leaving the evaporator (and which cool air enters the motor vehicle passenger area, not shown) and, governed by the setting on the thermostat, when the outlet air temperature is too warm the thermostat closes and the voltage at the positive pole of battery B is thereby connected, via unit 27, to the magnetic coil of series-parallel switch 19, i.e., terminal 39. The other side of the magnetic coil is grounded at terminal 40. This causes series-parallel switch 19 to close, and in the closed position terminals 41 and 42 are connected. As a result, the positive pole of battery A is connected to the negative pole of battery B, putting both 12 volt batteries in series to provide a 24 volt power source.

When switch 19 closes it also connects its terminals 43 and 44 together, and as a result the voltage on the positive pole of battery B is connected through terminals 43 and 44 to the magnetic coil of solenoid switch 20, terminals 45 and 46 with terminal 46 being grounded. With switch 20 energized, or closed, its terminals 47 and 48 are connected together and the voltage on the positive pole of battery B is connected to the input terminal 51 of electric motor 14. The other terminal 52 of the motor is grounded, as is the negative terminal of battery A. Since battery A and B are in series, and each supplies a 12 volt output, then a 24 volt power source is connected to the electric motor 14 to operate it. This halves the amperage or current drain that would be experienced by only one 12 volt battery and makes the system more feasible from a battery life standpoint.

When electric motor 14 is turned on it operates the compressor 10 through a mechanical linkage such as universal joint 53 shown in FIGURE 2. The compressor circulates refrigerant through the refrigerant cycle, and the outlet air temperature at the evaporator gradually lowers until the thermostat 27 opens. When the thermostat opens it disconnects battery B from the magnetic coil of series-parallel 19 and switch 19 opens. With switch 19 open its terminals 43 and 44 are disconnected and there is no longer any voltage or current to the coil terminals 45 and 46 of switch 20 and switch 20 also opens. With switch 20 open its terminals 47 and 48 are disconnected from each other and the input terminal of electric motor 14 is no longer connected to the batteries and it ceases to operate.

As can be seen then, this is a system that is either completely "on" or "off." When it is "off" the electric motor and compressor do not even idle. The fan 25 on the evaporator continues to operate, however, until it is turned off by a human operator.

The cycle of operation just described occurs again when the evaporator outlet air warms to a point where the thermostat closes once again.

During the periods when the switches 19 and 20 are open and the electric motor 14 is off, the generator 17, through voltage regulator 18, is recharging both batteries A and B. This recharging, of course, takes place only so long as the engine of the motor vehicle is running and operating the generator 17.

The charging of both batteries is due to the terminal connections within series-parallel switch 19 when it is in its open or unenergized position. At such time, terminal 41 on switch 19 is connected to terminal 43 and terminal 42 is connected to terminal 40, thereby causing the positive poles of both batteries to be connected to the generator output and the negative poles of both batteries to be grounded. There are a number of series-parallel switches commercially available that can be utilized to perform the functions of switch 19, which basically is to first connect two batteries in series and then in parallel, giving rise to the name of the switch.

While the schematic representation of FIGURE 1 is useful in explaining the operation of the invention, the illustration of FIGURE 2 is more helpful in disclosing one embodiment of the actual motor-compressor arrangement with attendant solenoid switch 20. Referring to FIGURE 2, the direct current motor 14 is shown connected to compressor 10 by a universal joint 53. The motor and compressor are both bolted to a mounting board or plate 54. Electrical cable 57 leads from terminal 47 of solenoid switch 20 to the positive terminal of battery B. Cables 58 and 59 are the input and ground cables respectively of the motor 14. Electrical wire 60 connects to terminal 45 of the solenoid switch from terminal 44 of the series-parallel switch as shown in FIGURE 1. The electrical lead or wire 61 connects to terminal 43 of switch 19 as shown in FIGURE 1, through circuit breaker 36 and an optional ammeter 31, which ammeter is in the generator charging circuit of battery B during the charging portion of the systems cycle. Electrical lead 62 is merely the ground lead from the evaporator and need not be connected to ground at this particular location.

It can be seen then that with the physical arrangement shown in FIGURE 2 a rapid installation of premounted components can be made on, say, the exterior wall of a truck cab, with a second battery being added under the engine hood. No mechanical connection of any kind need be made with the engine of the motor vehicle and installation time is thereby greatly reduced. Of course, as already indicated, there are other advantages including the elimination of fuel mileage loss and engine horsepower drain.

Although specific embodiments of the present invention have been described and illustrated, it is to be understood that the same are by way of illustration and example and that the invention is not limited thereto, and is not limited to the automotive field, as many variations will be readily apparent to those versed in the art and the invention is to be given its broadest possible interpretation.

I claim:

1. In an air conditioning system, the combination comprising: means for cooling air, means operatively connected to said air cooling means for compressing coolant, an electric motor drivingly connected to said compressing means, a pair of rechargable power supply means operatively connected for driving said electric motor, means for selectively interconnecting said power supply means with said electric motor, said selective interconnecting means including switch means, means for recharging said pair of rechargable power supply means, said recharging means being operatively connected to said switch means, whereby during certain periods of operation of said air cooling means said switch means functions to connect said pair of rechargeable power supply means in series relationship with said electric motor for driving same, and during certain other periods of operation of said air cooling means said switch means functions to connect said pair of rechargeable power supply means in parallel relationship with said recharging means for recharging said power supply means.

2. The combination defined in claim 1, wherein said air cooling means includes a fan unit and a thermostat unit, each of said units being operatively connected to said electrical power supply means, said thermostat unit functioning to initiate activation and deactivation of said switch means.

3. The combination defined in claim 2, wherein said thermostat unit and said fan unit are each provided with control means therefor.

4. The combination defined in claim 1, wherein said switch means includes a series-parallel switch assembly and a solenoid switch assembly.

5. The combination defined in claim 4, wherein said series-parallel switch assembly includes at least five electrical terminals, and said solenoid switch assembly includes at least four electrical terminals, a first terminal of said series-parallel switch terminals being operatively connected to one of said pair of rechargeable electrical power supply means, a second terminal of said series-parallel switch terminals being operatively connected to the other of said pair of rechargeable electrical power supply means, a third terminal of said series-parallel switch terminals being operatively connected to function as an electrical ground, a fourth terminal of said series-parallel switch terminals being operatively connected to said one of said power supply means and to a first terminal of said solenoid switch terminals, a fifth terminal of said series-parallel switch terminals being operatively connected to a second terminal of said solenoid switch terminals, a third terminal of said solenoid switch terminals being operatively connected to a terminal of said electric motor, a fourth terminal of said solenoid switch terminals being operatively connected to another terminal of said electric motor and said another power supply means.

6. The combination defined in claim 5, wherein said series-parallel switch additionally includes a sixth terminal operatively connected to function as an electrical ground.

7. The combination defined in claim 5, wherein said air cooling means includes a fan unit having at least two electrical terminals, and a thermostat unit having at least two electrical terminals, one terminal of each of said units being operatively connected to said one of said pair of power supply means and to said fourth terminal of said series-parallel switch assembly and to said first terminal of said solenoid switch assembly, the other terminal of said fan unit being operatively connected to function as an electrical ground, the other terminal of said thermostat unit being operatively connected to a seventh terminal of said series-parallel switch assembly.

8. The combination defined in claim 7, additionally including at least three circuit breaker means, a first of said circuit breaker means being operatively connected between said thermostat unit and said one of said power supply means, a second of said circuit breaker means being operatively connected between said series-parallel switch assembly and said one of said power supply means, and a third of said circuit breaker means being operatively connected between said series-parallel switch assembly and an electrical ground therefor.

9. The combination defined in claim 7, wherein said recharging means is operatively connected to said second terminal of said series-parallel switch assembly.

10. The combination defined in claim 1, wherein said recharging means is additionally connected to an external electrical circuit load.

11. The combination defined in claim 1, additionally including voltage regulator means and electrical current indicating means operatively connected between said recharging means and said switch means.

12. The combination defined in claim 1, additionally including electrical current indicating means operatively connected with said switch means for indicating electrical current flowing within said switch means.

13. The combination defined in claim 1, wherein said pair of rechargeable power supply means are each of the 12 volt battery type.

14. The combination defined in claim 1, wherein said air cooling means and said coolant compressing means are interconnected such that coolant from said compressing means is directed through said air cooling means and returned to said compressing means.

References Cited
UNITED STATES PATENTS

| | | | |
|---|---|---|---|
| 1,758,477 | 5/1930 | Smith | 62—230 |
| 1,887,224 | 11/1932 | Ward | 62—236 |
| 2,522,623 | 9/1950 | Likes | 62—236 |
| 2,532,234 | 11/1950 | Kimble | 62—236 |

MEYER PERLIN, Primary Examiner

U.S. Cl. X.R.

62—236, 323